(12) United States Patent
Okade et al.

(10) Patent No.: US 12,039,460 B2
(45) Date of Patent: Jul. 16, 2024

(54) INFORMATION PROVIDING SYSTEM AND DATA STRUCTURE

(71) Applicant: Universal Entertainment Corporation, Tokyo (JP)

(72) Inventors: Takaaki Okade, Tokyo (JP); Takuo Henmi, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 669 days.

(21) Appl. No.: 17/055,039

(22) PCT Filed: Apr. 22, 2019

(86) PCT No.: PCT/JP2019/017043
§ 371 (c)(1),
(2) Date: Nov. 12, 2020

(87) PCT Pub. No.: WO2019/220876
PCT Pub. Date: Nov. 21, 2019

(65) Prior Publication Data
US 2021/0216886 A1    Jul. 15, 2021

(30) Foreign Application Priority Data
May 17, 2018  (JP) ................................. 2018-095583

(51) Int. Cl.
*G06N 5/022* (2023.01)
*G06F 16/332* (2019.01)
*G06F 16/901* (2019.01)
*G06N 5/04* (2023.01)

(52) U.S. Cl.
CPC ........... *G06N 5/022* (2013.01); *G06F 16/901* (2019.01); *G06N 5/041* (2013.01); *G06F 16/3329* (2019.01)

(58) Field of Classification Search
CPC ........... G06N 5/00; G06N 5/02; G06N 5/022; G06N 5/025; G06N 5/04; G06N 5/041; G06N 20/00; G06N 20/10; G06N 20/20; G06F 16/3329; G06F 16/901
See application file for complete search history.

(56) References Cited

U.S. PATENT DOCUMENTS

2012/0036121 A1* 2/2012 Jitkoff ................. H04M 1/6041
707/706
2012/0102095 A1* 4/2012 Campbell ............. G06F 16/248
709/203
2017/0083969 A1* 3/2017 Takeda ................. G06F 16/951

FOREIGN PATENT DOCUMENTS

JP    2012-141713    7/2012
JP    2016-99968     5/2016

* cited by examiner

*Primary Examiner* — Shane D Woolwine
(74) *Attorney, Agent, or Firm* — Simpson & Simpson, PLLC; S. Peter Konzel

(57) ABSTRACT

To provide a scheme capable of easily generating knowledge data containing an enormous number of assumed input sentences (input sentences assumed to be inputted by a user) in an information providing system realizing a conversation with the user by outputting responses corresponding to inputs by the user to a terminal of the user. An information providing system develops sets of assumed input sentences and response sentences with respect to respective data stored in intermediate data based on a set of assumed input sentences and response sentences defined in template data in accordance with an instruction of a client or the like to generate knowledge data.

7 Claims, 11 Drawing Sheets

FIG. 8A

240 TEMPLATE DATA

| | CATEGORY | TYPE | QA DIS-CRIMI-NATION | NO | Q/A | SUBORDI-NATE NO | CONDITION |
|---|---|---|---|---|---|---|---|
| D1 | MERCHANDISE GUIDANCE (MEDICINE) | M | Q | 001 | DO YOU HAVE A MEDICINE NAMED $ (<! [cdata [return getAllMedicineName () ] ] >)? | — | — |
| | MERCHANDISE GUIDANCE (MEDICINE) | M | A | 002 | YES, WE DO | 001 | &[stock]>0 |
| | MERCHANDISE GUIDANCE (MEDICINE) | M | Q | 003 | WHAT KINDS OF MERCHANDISE DO YOU HAVE? | 002 | — |
| | MERCHANDISE GUIDANCE (MEDICINE) | M | A | 004 | WE HAVE $ (<! [cdata[return getStockMedicineInfo () ] ] >) IN & [UI_m-name] | 003 | — |
| | MERCHANDISE GUIDANCE (MEDICINE) | M | Q | 005 | ... | 004 | — |
| | MERCHANDISE GUIDANCE (MEDICINE) | M | Q | 101 | DO YOU HAVE TABLET TYPE? | 002 | — |
| | MERCHANDISE GUIDANCE (MEDICINE) | M | A | 102 | ... | 101 | ... |
| | MERCHANDISE GUIDANCE (MEDICINE) | M | Q | 151 | HOW MUCH IS THAT? | 002 | — |
| | MERCHANDISE GUIDANCE (MEDICINE) | M | A | 152 | ... | 151 | ... |
| | MERCHANDISE GUIDANCE (MEDICINE) | M | A | 201 | WE'RE SORRY,... | 001 | &[stock]=0 |
| | MERCHANDISE GUIDANCE (MEDICINE) | M | Q | 202 | ... | 201 | ... |
| | ROUTE GUIDANCE | — | D | 501 | BOOKSTORE | — | — |

FIG. 8B — 250 KNOWLEDGE DATA

| | CATEGORY | TYPE | QA DIS-CRIMI-NATION | NO | Q/A | SUB-ORDI-NATE NO | CONDITION | SUPPLE-MENTARY INFORMA-TION |
|---|---|---|---|---|---|---|---|---|
| D2 | MERCHANDISE GUIDANCE (MEDICINE) | M | Q | 1001 | DO YOU HAVE A MEDICINE NAMED M1? | — | — | — |
| | MERCHANDISE GUIDANCE (MEDICINE) | M | A | 1002 | YES, WE DO | 001 | &[stock]>0 | — |
| | MERCHANDISE GUIDANCE (MEDICINE) | M | Q | 1003 | WHAT KINDS OF MERCHANDISE DO YOU HAVE? | 002 | — | — |
| | MERCHANDISE GUIDANCE (MEDICINE) | M | A | 1004 | WE HAVE MERCHANDISE NAME M1a...IN & [UI_m-name] | 003 | — | URL1 |
| | MERCHANDISE GUIDANCE (MEDICINE) | M | Q | 1005 | ... | 004 | — | — |
| | MERCHANDISE GUIDANCE (MEDICINE) | M | Q | 1101 | DO YOU HAVE TABLET TYPE? | 002 | — | — |
| | MERCHANDISE GUIDANCE (MEDICINE) | M | A | 1102 | ... | 101 | ... | ... |
| | MERCHANDISE GUIDANCE (MEDICINE) | M | Q | 1151 | HOW MUCH IS THAT? | 002 | — | — |
| | MERCHANDISE GUIDANCE (MEDICINE) | M | A | 1152 | ... | 151 | ... | ... |
| | MERCHANDISE GUIDANCE (MEDICINE) | M | A | 1201 | WE'RE SORRY,... | 001 | &[stock]=0 | — |
| | MERCHANDISE GUIDANCE (MEDICINE) | M | Q | 1202 | ... | 201 | ... | ... |
| D3 | MERCHANDISE GUIDANCE (MEDICINE) | M | Q | 2001 | DO YOU HAVE A MEDICINE NAMED M2? | — | — | — |
| | MERCHANDISE GUIDANCE (MEDICINE) | M | A | 2002 | YES, WE DO | 301 | &[stock]>0 | — |
| | MERCHANDISE GUIDANCE (MEDICINE) | M | Q | 2003 | WHAT KINDS OF MERCHANDISE DO YOU HAVE? | 302 | — | — |
| | MERCHANDISE GUIDANCE (MEDICINE) | M | A | 2004 | WE HAVE MERCHANDISE NAME M2a...IN & [UI_m-name] | 303 | — | URL2 |
| | MERCHANDISE GUIDANCE (MEDICINE) | M | Q | 2005 | ... | 304 | — | — |
| | ... | ... | ... | ... | ... | ... | ... | ... |
| | MERCHANDISE GUIDANCE (MEDICINE) | M | A | 2201 | WE'RE SORRY, ... | 2001 | &[stock]=0 | — |
| | MERCHANDISE GUIDANCE (MEDICINE) | M | Q | 2202 | ... | 2201 | ... | ... |
| | ... | ... | ... | ... | ... | ... | ... | ... |
| | ROUTE GUIDANCE | — | D | 1501 | BOOKSTORE | — | — | — |
| | ROUTE GUIDANCE | ... | ... | ... | ... | ... | ... | ... |

INFORMATION PROVIDING SYSTEM AND DATA STRUCTURE

CROSS REFERENCE TO RELATED APPLICATIONS

This National Stage application claims priority to PCT International App. No. PCT/JP2019/017043, filed Apr. 22, 2019, which application claims priority to Japanese Pat. App. No. 2018-095583, filed May 17, 2018, both of which applications are incorporated herein by reference.

TECHNICAL FIELD

The present invention relates to an information providing system providing information in response to an input of a user.

BACKGROUND ART

In recent years, a study concerning a system searching for an optimal solution to a question from a user and responding to the question is actively being conducted. Moreover, a study concerning a natural language processing technique and an artificial intelligence technique for analyzing a construction or a meaning of the question inputted by the user or for searching for the solution to the question is also proceeding in connection with the development of such system.

For example, there is disclosed an information providing system receiving an input character string from a user, determining response contents corresponding to the input character string based on knowledge data and transmitting response data containing the response contents to a terminal of the user (refer to Patent Literature 1).

The information providing system is provided with knowledge data containing character strings and response character strings in association with the character strings. When a character string close to the input character string of the user is found in the character strings in the knowledge data, the system determines response contents based on a response character string corresponding to the character string.

CITATION LIST

Patent Literature

PTL 1: JP-2016-99968

SUMMARY OF INVENTION

Technical Problem

However, to prepare knowledge data in which character strings corresponding to the input character strings from users and response character strings are respectively defined in the above information providing system is extremely complicated when the number of corresponding input character strings and topics is enormous, and the maintenance of such knowledge data will be a heavy burden.

In view of the above, an object of the present invention is to provide a scheme capable of easily generating knowledge data containing an enormous number of assumed input sentences (input sentences assumed to be inputted by the user) in an information providing system realizing a conversation with the user by outputting a response corresponding to the input of the user to the terminal of the user.

Another object of the present invention is to provide an information providing system capable of easily generating knowledge data from existing another data.

Solution to Problems

The present invention provides the following information providing system and data structure.

An information providing system according to a first aspect of the present invention includes an input receiving unit receiving inputs from a terminal (for example, a user terminal 10) operated by a user (for example, a user 10), a response determination unit determining response contents outputted to the terminal in response to the inputs, and knowledge data (for example, knowledge data 250), in which the knowledge data includes a plurality of sets (for example, D2, D3 and so on of the knowledge data 250 shown in FIG. 8B) of assumed input sentences (for example, assumed input sentences (Q) of the knowledge data 250 shown in FIG. 8B) assumed as the inputs and response sentences (for example, response sentences (A) of the knowledge data 250 shown in FIG. 8B) corresponding to the assumed input sentences, at least part of the sets of the assumed input sentences and the response sentences is generated by developing a set (for example, D1 of template data 240 shown in FIG. 8A) of template assumed input sentences (for example, assumed input sentences (Q) of the template data 240 shown in FIG. 8A) and template response sentences (for example, response sentences (A) of the template data 240 shown in FIG. 8A) which are previously defined with respect to respective prescribed data groups (for example, data stored in intermediate data 350), and when the input relates to any of the assumed input sentences in the knowledge data, the response determination unit determines the response contents based on a response sentence corresponding to the relating assumed input sentence.

According to the configuration of the present invention, the template data is developed into the knowledge data with respect to the prescribed data groups; therefore, knowledge data including an enormous number of assumed input sentences can be easily generated. As a result, the labor for companies or organizations providing knowledge data is reduced.

In the information providing system according to a second aspect of the present invention, when a prescribed code is included in the response sentence corresponding to the relating assumed input sentence in the first aspect, the response determination unit may acquire data corresponding to the prescribed code and may determine the response contents based on the acquired data.

According to the configuration of the present invention, after static knowledge data is generated based on the template data, the response corresponding to the input sentence of the user is determined based on the contents of the knowledge data and data dynamically acquired in accordance with the prescribed code; therefore, the response can be given to the user flexibly while enjoying the benefit that knowledge data including an enormous number of assumed input sentences can be easily generated.

In the information providing system according to a third aspect of the present invention, the proscribed data groups may be capable of being generated from existing management data in the first or second aspect.

According to the configuration of the present invention, for example, assumed input sentences and response sentences corresponding to respective merchandise included in a merchandise list of one's own company can be stored in the knowledge data; therefore, the contents of management data and the contents of knowledge data of one's own company can be easily associated with each other.

A data structure of template data according to a fourth aspect of the present invention is for generating knowledge data used for determining the response contents in an information providing system realizing a conversation with a user by receiving inputs from a terminal operated by the user and outputting responses corresponding to the inputs to the terminal, which includes a set of template assumed input sentences assumed as the inputs and template response sentences corresponding to the template assumed input sentences, in which a code for controlling the set of the template assumed input sentences and the template response sentences to be developed with respect to respective prescribed data groups is included in the template assumed input sentence.

According to the configuration of the present invention, knowledge data of the information providing system can be easily generated by developing the knowledge data (for example, with respect to respective merchandise of one's own company) from one template (pattern), as a result, the labor of companies or organizations providing knowledge data can be reduced.

Advantageous Effects of Invention

In the information providing system according to the present invention, the scheme capable of easily generating knowledge data including an enormous number of assumed input sentences is provided, which reduces the labor of companies or organization providing knowledge data is reduced.

Also in the information providing system according to the present invention, knowledge data can be easily generated from existing data such as management data in companies or organization; therefore, unified management of management data and knowledge data becomes easy, which realizes prompt and accurate response to fluctuations in data.

BRIEF DESCRIPTION OF DRAWINGS

FIGS. 8A-8B are charts showing examples of template data and knowledge data in the information providing system according to the embodiment of the present invention;

DESCRIPTION OF EMBODIMENTS

Hereinafter, an information providing system 1 according to an embodiment of the present invention will be explained with reference to the drawings.

Figure 1:
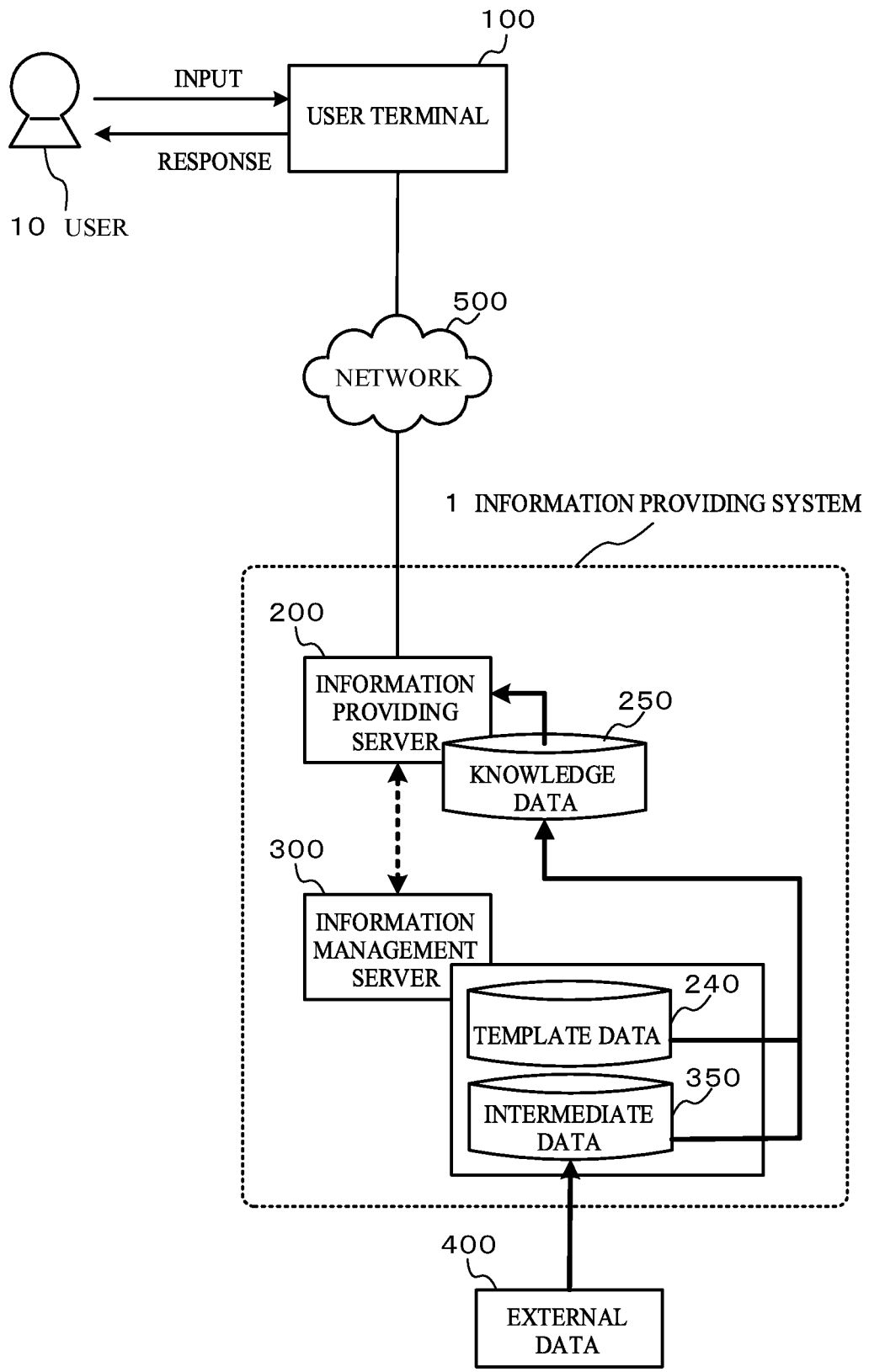
FIG. 1 is a diagram showing an outline of an information providing system according to an embodiment of the present invention.

FIG. 1 is a diagram showing an outline of a system including the information providing system 1 that realizes a conversation with a user by providing a response corresponding to an input of the user.

A user 10 inputs a character string in an input area of a given WEB page displayed by a WEB browser executed in a user terminal 100 (by using, for example, a keyboard or a touch panel of the user terminal 100). Here, the character string inputted by the user 10 generally has a form of a sentence (input sentence), which is expressed by natural language. The input by the user will be expressed as the "input sentence" in the following description; however, it is not always necessary that the input has the form of the sentence, but the input includes various types of input character strings containing part of a word or a sentence.

Here, the WEB page displayed by the WEB browser of the user terminal 100 includes WEB pages having various applications and functions which are, for example, a WEB page in which ingredients or indications of merchandise such as medicines are explained or orders of such merchandise are received, a WEB page in which for responding to inquiries about locations or services of facilities such as restaurants and so on. The user 10 exchanges messages with the information providing system 1 in a conversation style, allowing the user terminal 100 to display information concerning merchandise or facilities as a response to the input sentence inputted by the user 10.

The WEB browser executed in the user terminal 100 is configured to display the input area in which the input character string is inputted and responses such as information about merchandise and facilities; however, other applications executed in the user terminal 100 may display the input area and the responses.

Next, the input sentence inputted from the user terminal 100 by the user 10 is provided to the information providing system 1 through a network 500 by the WEB browser of the user terminal 100. Here, the network 500 is a network including, for example, Internet.

The information providing system 1 is configured to include an information providing server 200 and an information management server 300. The information providing server 200 includes knowledge data 250 for providing responses useful for the user 10. The information management server 300 includes template data 240 and intermediate data 350. The information management server 300 generates the knowledge data 250 based on the template data 240 and the intermediate data 350. The information management server 300 generates the intermediate data 350 by taking in external data 400.

The intermediate data 350 or client knowledge data 410 can be referred to according to need when the information providing server 200 determines the response contents with respect to the input sentence of the user 10. The client knowledge data 410 is configured to be contained in the external data 400 in this example. The client knowledge data 410 is various information concerning clients including, for example, inventory information of merchandise and so on.

When the input sentence is received from the user terminal 100, the information providing server 200 of the information providing system 1 determines whether there is an input sentence (assumed input sentence) relating to the input sentence in the knowledge data 250 or not, acquiring a response sentence corresponding to the relating assumed input sentence from the knowledge data 250 when the relating assumed input sentence exists in the knowledge data 250, and determines the response contents to be displayed on the user terminal 100 based on the acquired response sentence.

The knowledge data 250 contains plural sets of assumed input sentences assumed to be inputted by the user 10 and response sentences as responses with respect to the assumed input sentences. The information providing server 200 determines whether there is an assumed input sentence relating to the input sentence of the user 10 in assumed input sentences in the knowledge data 250 or not. In this case, it is not necessary that the input sentence of the user 10 completely coincides with the assumed input sentence in the knowledge data 250. The both sentences are determined to be related to each other in a case where prescribed determination criteria (for example, indicating that meaning is close) are satisfied even when they do not completely coincide with each other.

Here, when the information providing system 1 is provided as a system usable by unspecified users, a general user who asks a question (about merchandise, services and so on) to companies or organizations providing WEB sites is assumed as the user 10, and a smart phone, a PC (personal computer) or the like possessed by the user 10 which can be connected to Internet or the like is normally assumed as the user terminal 100.

In general, the external data 400 is provided by companies and so on (hereinafter referred to as "clients" in the sense that they are suppliers using the information providing system 1 for a provider of the information providing system 1) different from a company and an organization providing the information providing system 1. The external data 400 contains, for example, management data of merchandise and the like sold by clients. An instruction for processing of generating the intermediate data 350 based on the external data 400 is normally provided by the client.

FIG. 1 shows a configuration in which questions and so on are provided to the information providing system 1 by the user 10 inputting the character string in the input area of the WEB site by using the keyboard or the like; however, the information providing system 1 may receive the character string by any method or route. For example, when the user asks a question by voice, it is possible to perform voice recognition processing to the voice to be converted into a character string and to provide the converted character string to the information providing system 1. It can be considered that a printed question item or the like is converted into a character string by OCR (optical character recognition) and that the converted character string is provided to the information providing system 1.

The response sentence from the information providing system 1 may be provided to the user terminal 100 not only by characters but various methods and routes such as voice, figures and so on.

The information providing server 200 according to the embodiment also has a function of a WEB server performing data transmission/reception by the WEB browser and a protocol such as http executed in the user terminal 100 and operating so as to display a given WEB page by the WEB browser.

The information providing server 200 and the information management server 300 are shown as independent computers respectively in this case; however, it is also possible to configure these servers by plural computers which execute the same functions while allocating these functions. It is also preferable that the information providing server 200 and the information management server 300 are integrated to be realized as one computer.

Moreover, in the embodiment, the knowledge data 250, the template data 240, and the intermediate data 350 are configured as independent data respectively; however, data stored in this manner may be divided in various units and may be allocated to plural sites or computers. The knowledge data 250, the template data 240, and the intermediate data 350 may be stored in any type of data format. For example, CSV data, text data, a database accessible by a prescribed DBMS (database management system), specific files accessible by a prescribed application and so on can be cited.

Figure 2:
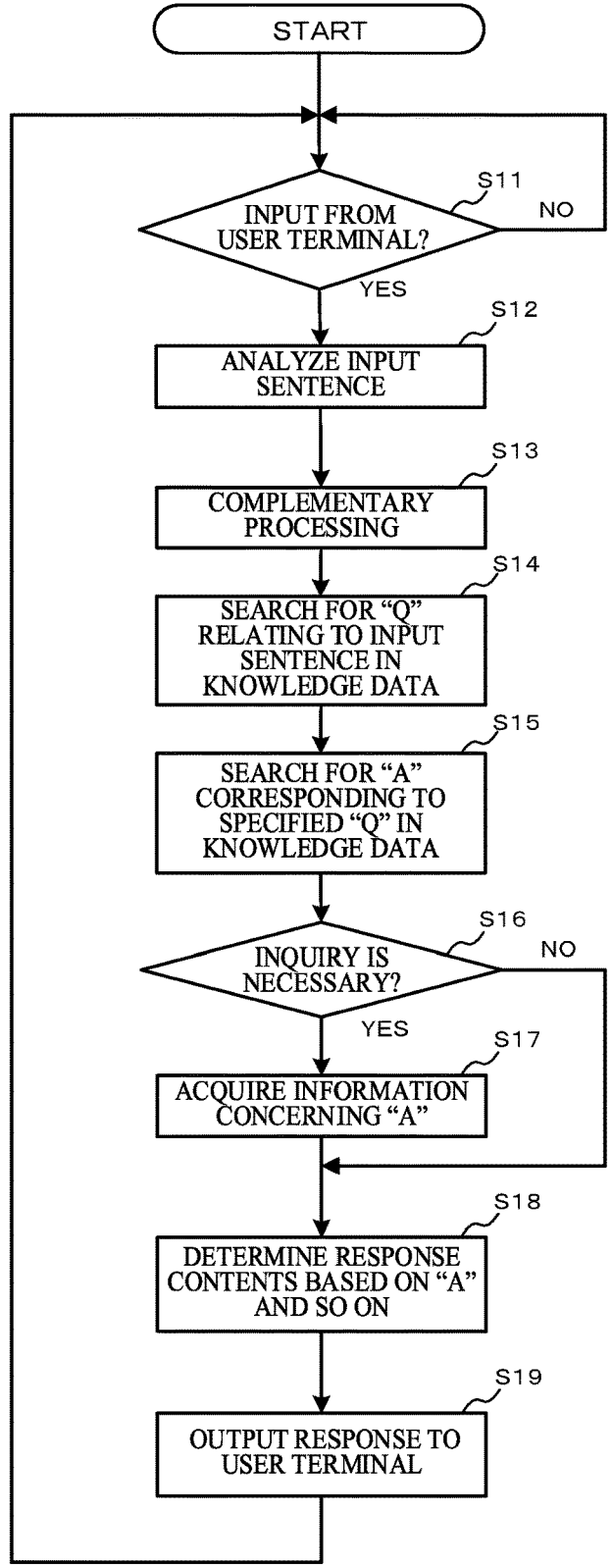
FIG. 2 is a flowchart illustrating response sentence output processing in the information providing system according to the embodiment of the present invention.

FIG. 2 is a flowchart showing the flow of response sentence output processing in the information providing system 1 according to the embodiment. In the processing, as described above, the information providing server 200 determines the response contents with respect to the input sentence of the user 10 by referring to the knowledge data 250 and performs control so as to display the response sentence on the user terminal 100.

First, the information providing server 200 determines whether the input sentence of the user 10 has been received from the user terminal 100 or not in Step S11. When the input sentence has not been received (No in Step S11), the determination processing is repeated. When the input sentence has been received (YES in Step S11), the process proceeds to Step S12.

In Step S12, the information providing server 200 analyzes the input sentence of the user 10 received from the user terminal 100. The analysis processing is, for example, morphological analysis or semantic analysis. According to such analysis, words included in the input sentence are extracted as well as a phrase and a sentence are recognized.

Next, the process proceeds to Step S13, where complementary processing is performed. In the complementary processing, wording processing for adjusting wording, modification relation analysis processing, determination processing of parent-child relation of words, determination processing of word importance, determination processing of affirmative and negative, and so on are performed, so that effective comparison with the assumed input sentences contained in the knowledge data 250 can be performed.

Next, the assumed input sentence (here, the assumed input sentence stored in the knowledge data 250 is denoted by "Q" according to need) relating to the input sentence of the user 10 is searched in the knowledge data 250 in Step S14. In a case where the assumed input sentence (Q) relating to the input sentence of the user 10 is found in the knowledge data 250, the response sentence (here, the response sentence stored in the knowledge data 250 is denoted by "A" according to need) corresponding to the found assumed input sentence (Q) is searched and acquired in the knowledge data 250 in Step S15. In this case, not only the assumed input sentence coinciding with the input sentence of the user 10 but also the input sentence determined to have close meaning to the input sentence of the user 10 can be selected as the relating assumed input sentence (Q).

In a case where the assumed input sentence (Q) relating to the input sentence of the user 10 is not found in the knowledge data 250, the information providing server 200 can display a message indicating that the response to the input sentence has not been found, a question for confirming intention of the input sentence, or an induction to another topic on the user terminal 100; however, the processing is omitted in this flow.

Next, the contents of the response sentence (A) acquired in Step S15 are determined and whether a prescribed inquiry is necessary or not for generating response contents is determined in Step S16. The determination processing is made according to whether a code in a prescribed format is contained in the response sentence (A) or not. When it is determined that the inquiry is necessary (YES in Step S16), the information providing server 200 accesses the intermediate data 350 shown in FIG. 1, the client knowledge data 410, and so on to acquire information concerning the response sentence (A) corresponding to the prescribed code (Step S17). The information providing server 200 may acquire information concerning the response sentence (A) corresponding to the prescribed code from the input sentence inputted by the user 10. The information providing server 200 accesses the intermediate data 350 or the external client knowledge data 410 (external data 400) via the information management server 300 by using API or the like.

As described above, the information providing server 200 acquires necessary data by accessing various resources such as the intermediate data 350, the client knowledge data 410 and the input sentence from the user 10 in accordance with the code written in the response sentence (A). From which resource the server acquires data can be determined according to a system of the code or the contents of the code. Which resource the server accesses by which method may be determined by referring to data defined separately in accordance with the code written in the response sentence (A).

After Step S17, or in a case where it is determined that the inquiry is not necessary (NO in Step S16), the processing proceeds to Step S18, where the information providing server 200 determines the response contents to be provided to the user 10 based on the acquired response sentence (A). In a case where information concerning the response sentence (A) corresponding to the prescribed code has been acquired in Step S17, the response contents to be provided to the user 10 are determined and generated based on the information and the response sentence (A).

Next, the information providing server 200 performs control so as to output the response generated in Step S18 to the user terminal 100 in Step S19. For example, when the user terminal 100 transmits the input of the user 10 by the WEB browser, a WEB page configured to display the response contents is generated and data containing the WEB page is transmitted to the user terminal 100.

Figure 3:
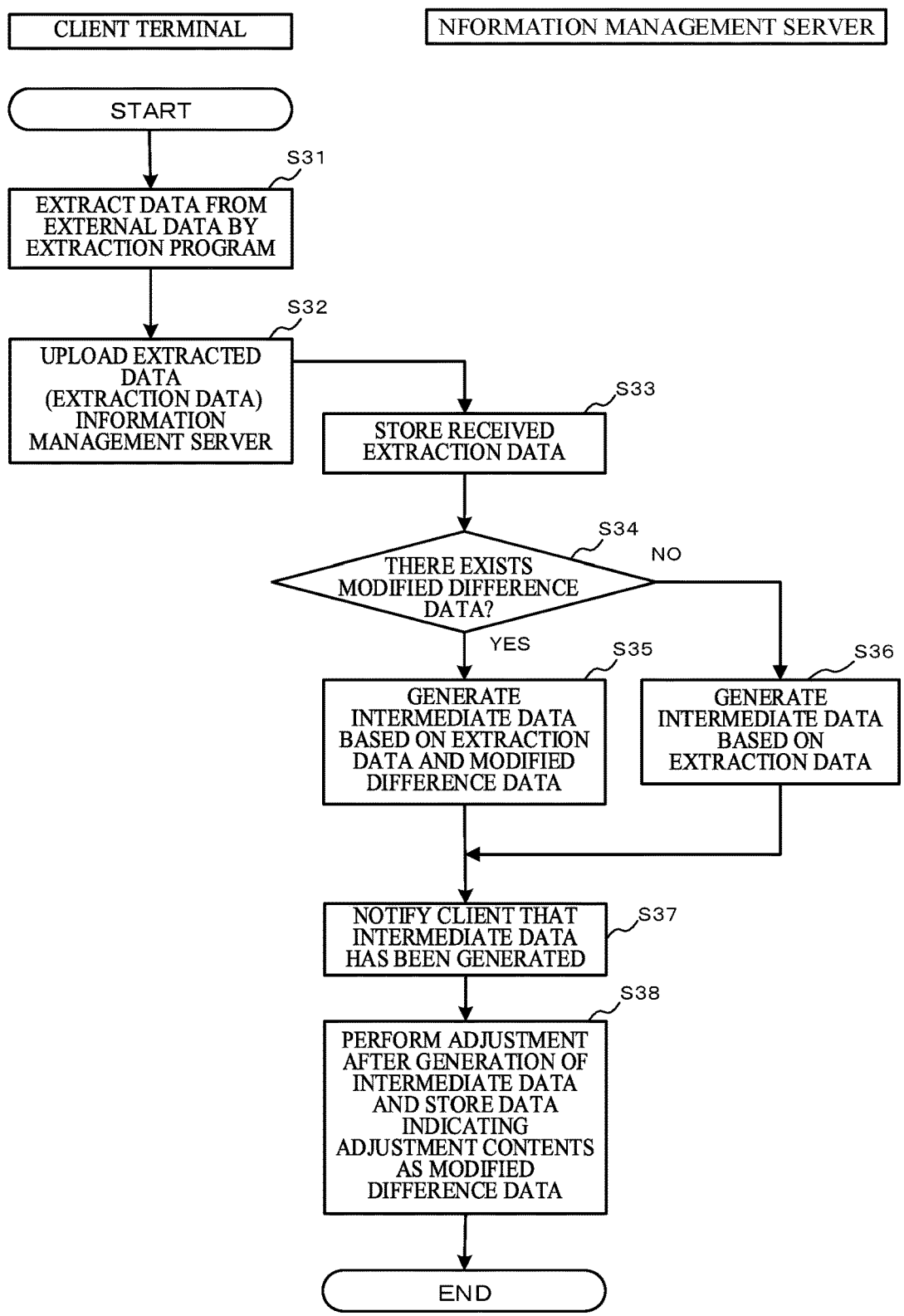
FIG. 3 is a flowchart illustrating intermediate DB generation processing of the information providing system according to the embodiment of the present invention.

FIG. 3 is a flowchart showing the flow of intermediate data generation processing in the information providing system 1 according to the embodiment. In the processing, as described above, the information management server 300 performs control so as to generate the intermediate data 350, for example, by taking in data of the external data 400 which is data managed by the client by an instruction of the client. The intermediate data generation processing is performed repeatedly at various timings such as at a timing when there is a change in the external data 400 or at a set periodic timing.

First, in a client terminal 150 used by a client (namely, a user of the information providing system 1 and a company or the like providing information to the user 10), an extraction program is executed by an instruction of the client and data is extracted from the external data 400, then, the data is processed according to need (Step S31). Here, the external data 400 is, for example, merchandise data or knowledge data managed by the client.

The external data 400 may be any kind of file, or may be plural files. For example, the external data 400 can be configured to contain data storing information of merchandise dealt with by the client, a file in which response patterns corresponding to respective merchandise are defined, and a file in which synonymous words are defined. Data extracted from the external data 400 is data for generating the above-described knowledge data eventually.

Next, in Step S32, the data extracted in Step S31 (extraction data) is uploaded to the information management server 300 from the client terminal 150 by an instruction of the client.

In Step S33, the information management server 300 receiving the extraction data from the client terminal 150 stores the extraction data in a prescribed storage device. Next, whether there exists modified difference data separately stored in the storage device or not is determined in Step S34.

When it is determined that there exists the modified difference data (YES in Step S34), the intermediate data 350 is generated based on the extraction data and the modified difference data in Step S35.

If the above-described external data 400 is, for example, an merchandise management DB storing information of merchandise (medicines) dealt with by the client, the merchandise management DB stores items such as a product ID, a product name, a general name, a standard, color and size, an equivalent product name, and a detailed information URL. The extraction program selects necessary items from these items and takes data from the determined storage position to generate the intermediate data 350. The intermediate data 350 is configured to contain plural records in a prescribed data format, which is for example, "{"product ID":"1", "product name":"M1a", "general name":"M1", "identification code":"S1", "standard":"tablet 60 mg", "equivalent":["SA1", "SA2", "SB tablet 60 mg"], "color size":{"diameter (mm)":"7.0", "thickness (mm)":"3.8", "color tone":"yellow"}, "detailed information URL":"URL-1a"}".

On the other hand, when it is determined that there does not exist the modified difference data (NO in Step S34), the intermediate data 350 is generated based on the extraction data and the modified difference data in Step S36. There does not exist the modified difference data when the client generates the intermediate data 350 first; therefore, the intermediate data 350 is generated by the processing of Step S36.

After Step S35 or Step S36, the generation of the intermediate data 350 is notified to the client by transmitting the notification to the client terminal 150 (for example, through an email or the like) in Step S37.

Next, in Step S38, the information management server 300 performs data adjustment after the generation of the intermediate data 350 and stores data indicating the contents and history of adjustment in the storage device as the modified difference data. Such adjustment of the intermediate data 350 may be performed from the client terminal 150 in accordance with an instruction of the client, or may be performed in accordance with an instruction of a provider or an administrator of the information providing system 1. It is also possible that the information providing system 1 automatically adjusts the data while following specified rules.

Also in Step S38, data may be reflected to the intermediate data 350 immediately based on the modified difference data, or there is a case where data is exported as unadjusted data without being reflected to the intermediate data 350 at that time, then, the data is adjusted and stored as the modified difference data (in this case, the adjusted data is reflected to the intermediate data 350 at the next intermediate data generation processing).

As described above, data indicating the contents and history of adjustment concerning the intermediate data 350 is separately stored as the modified difference data, and the modified difference data is used as original data of the intermediate data 350 at every intermediate data generation processing (refer to Step S35), thereby generating the adjusted intermediate data 350 with a simple procedure without modifying the external data 400 in accordance with the adjustment of the intermediate data 350, as a result, unified management of the external data 400 can be easily performed.

Figure 4:
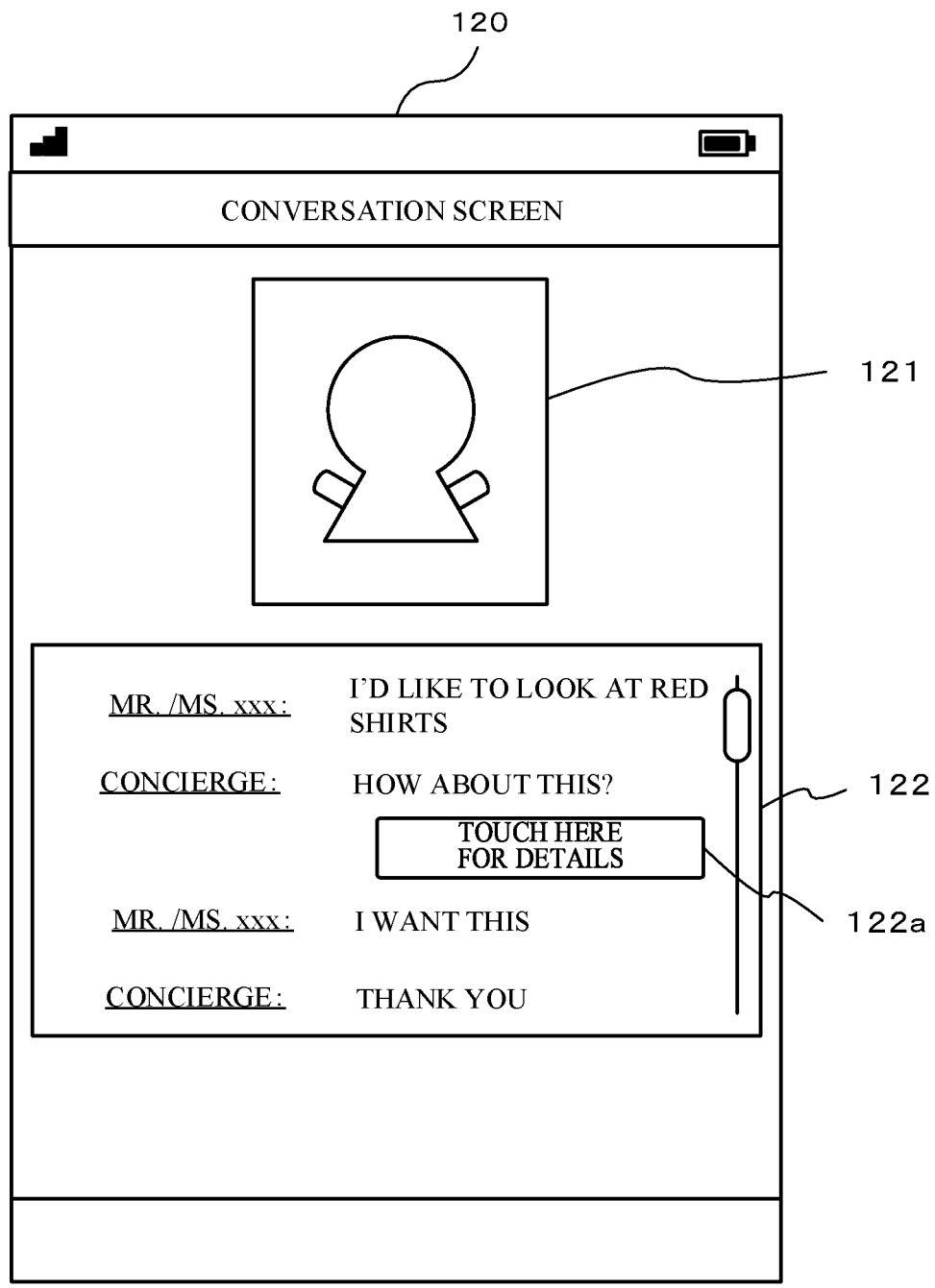
FIG. 4 is a view illustrating a graphical user interface on a conversation screen in a user terminal in the information providing system according to the embodiment of the present invention.

FIG. 4 shows an example of a graphical user interface (GUI) of a conversation screen 120 on the user terminal 100. On the conversation screen 120, a mascot display part 121 and an input response display part 122 are shown. On the mascot display part 121, a mascot as a concierge changing expression and motion so as to correspond to the display of the input or the response of the user 10 is displayed. On the input response display part 122, the input sentence including questions and so on inputted to the user terminal 100 by the user 10 is displayed, and the response corresponding to the input sentence from the information providing system 1 is further displayed. As shown in the input response display part 122, displays of the input sentences and responses are developed in time series in a lower direction according to a conversation exchange between the user 10 and the information providing system 1.

Moreover, as shown in FIG. 4, a link button 122*a* for displaying detailed information relating to the response is shown in addition to the response sentence in the response from the information providing system 1. For example, when the user 10 presses (or touches) the link button 122*a*, the display on the user terminal 100 makes transition to another WEB page displaying detailed information. Additionally, it is possible to display detailed information or images of merchandise and the like on a lower part of the input response display part 122 for displaying information relating to the response.

Figure 5:
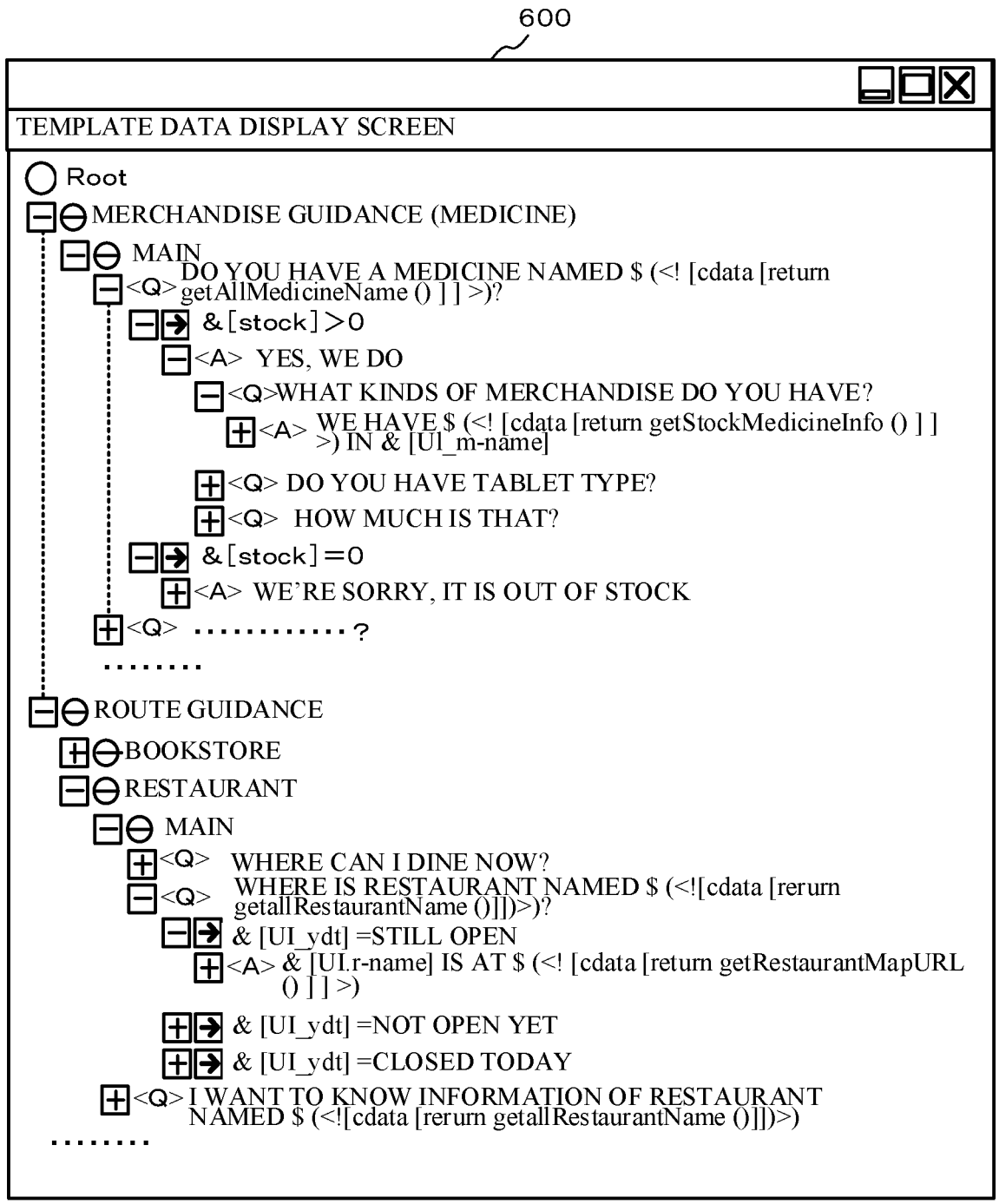
FIG. 5 is a chart illustrating a template data display screen relating to the information providing system according to the embodiment of the present invention.

FIG. 5 is a chart showing an example of a template data display screen 600. The template data 240 is data to be a source of the knowledge data 250, which is created by the client or the provider, the administrator or the like of the information providing system 1 (by transmitting an instruction to the information management server 300 from the terminal). The template data display screen 600 is a screen displayed by editing the template data 240, which is displayed, for example, on a terminal of a creator connected to the information management server 300.

The template data shown as an example on the template data display screen 600 of FIG. 5 contains data to be a source of knowledge data concerning merchandise guidance of medicines and data to be a source of knowledge data concerning route guidance of facilities such as bookstores or restaurants.

Here, in the template data display screen 600 of FIG. 5, respective template data is shown in a form of directories in a file system, and respective data is shown in a hierarchy indicating subordination relationship with respect to other data. Data displayed with a symbol of a minus sign surrounded by a square represents a state in which lower subordinate data concerning the data is displayed, and data displayed with a symbol of a plus sign surrounded by a square represents a state in which lower subordinate data concerning the data is not displayed.

Moreover, "<Q>" on a right side of the symbol indicates that the sentence is a template of the assumed input sentence, and "<A>" indicates that the sentence is a template of the response sentence. Furthermore, data displayed with a symbol of an arrow sign surrounded by a square indicates that the data is a template of a response sentence with a condition.

For example, in "main" of template data concerning merchandise guidance of medicines, a character string saying "Do you have a medicine named "$ (<![cdata [return getAllMedicineName ( )]]>)?" is defined as a template of a first assumed input sentence. A character string "$ (<![cdata [return getAllMedicineName ( )]]>)" in the above is a code for incorporating general names or the like of respective medicines based on the intermediate data 350 as described later.

As data subordinate to the template of the first assumed input sentence, a template of the response sentence with a condition "& [stock]>0" is defined. In this template, when the data acquired in accordance with the code of & [stock] (a stock quantity in the client acquired from the intermediate data 350 or the client knowledge data 410 in this case) exceeds 0 (zero), "Yes, we do" is associated as the template of the response sentence represented by the subordinate symbol.

Moreover, there are three templates of assumed input sentences subordinate to the template of the response sentence "Yes, we do", which define input sentences "What kinds of merchandise do you have?", "Do you have a tablet type?", and "How much is that?", respectively.

As a template of the response sentence subordinate to the template of the assumed input sentence "What kinds of merchandise do you have?", a template "$ (<![cdata [return getStockMedicineInfo ( )]]>)" in "& [Ul_m-name]" is defined without a condition. Here, "& [Ul_m-name]" represents a name of a medicine extracted from the input sentence of the user 10, which is data acquired in accordance with a code of "& [Ul_m-name]".

The character string "$ (<![cdata [return getStockMedicineInfo ( )]]>)" is a code for incorporating product names and so on of medicines in stock based on the intermediate data 350 as described later.

There exist templates of response sentences subordinate to the templates of assumed input sentences "Do you have a tablet type?" and "How much is that?" respectively; however, these templates are not displayed on the template data display screen 600 (the symbols relating to the templates of the assumed input sentences are "+" surrounded by the square).

As another data subordinate to the above template of the first assumed input sentence, a template of the response sentence with a condition "& [stock]=0" is defined. In this template, when data acquired in accordance with the code of &[stock] (the stock quantity in the client in this case) is 0 (zero), "We're sorry, it is out of stock" is associated as the template of the response sentence represented by the subordinate symbol.

There exist templates of response sentences subordinate to the template of the assumed input sentence "We're sorry, it is out of stock"; however, they are not displayed on the template data display screen 600 (the symbol relating to the template of the assumed input sentence is represented by "+" surrounded by the square).

Similarly, templates of the assumed input sentences and response sentences corresponding to them are defined also concerning route guidance of facilities such as bookstores or restaurants. Moreover, a code "$ ( . . . )" is a code for incorporating corresponding data respectively based on the intermediate data 350 and "& [ . . . ]" is a code for acquiring data extracted from the intermediate data 350, the client knowledge data 410, or the input sentences of the user 10 in the same manner as codes concerning the above merchandise guidance of medicines.

As shown in FIG. 5, the template data 240 is displayed in the hierarchy like directories in the file system. For example, the response sentence subordinate to the assumed input sentence is a response sentence to be displayed with respect to the assumed input sentence, and the assumed input sentence further subordinate to the response sentence is an input sentence assumed to be inputted with respect to the response sentence. It is found that a scenario of the conversation is defined by the above hierarchy.

The template data has a later-described data structure, which can be edited by a text editor or the like, and it is also possible to edit the data such as addition, modification, and deletion on the template data display screen 600 of FIG. 5.

Figure 6:
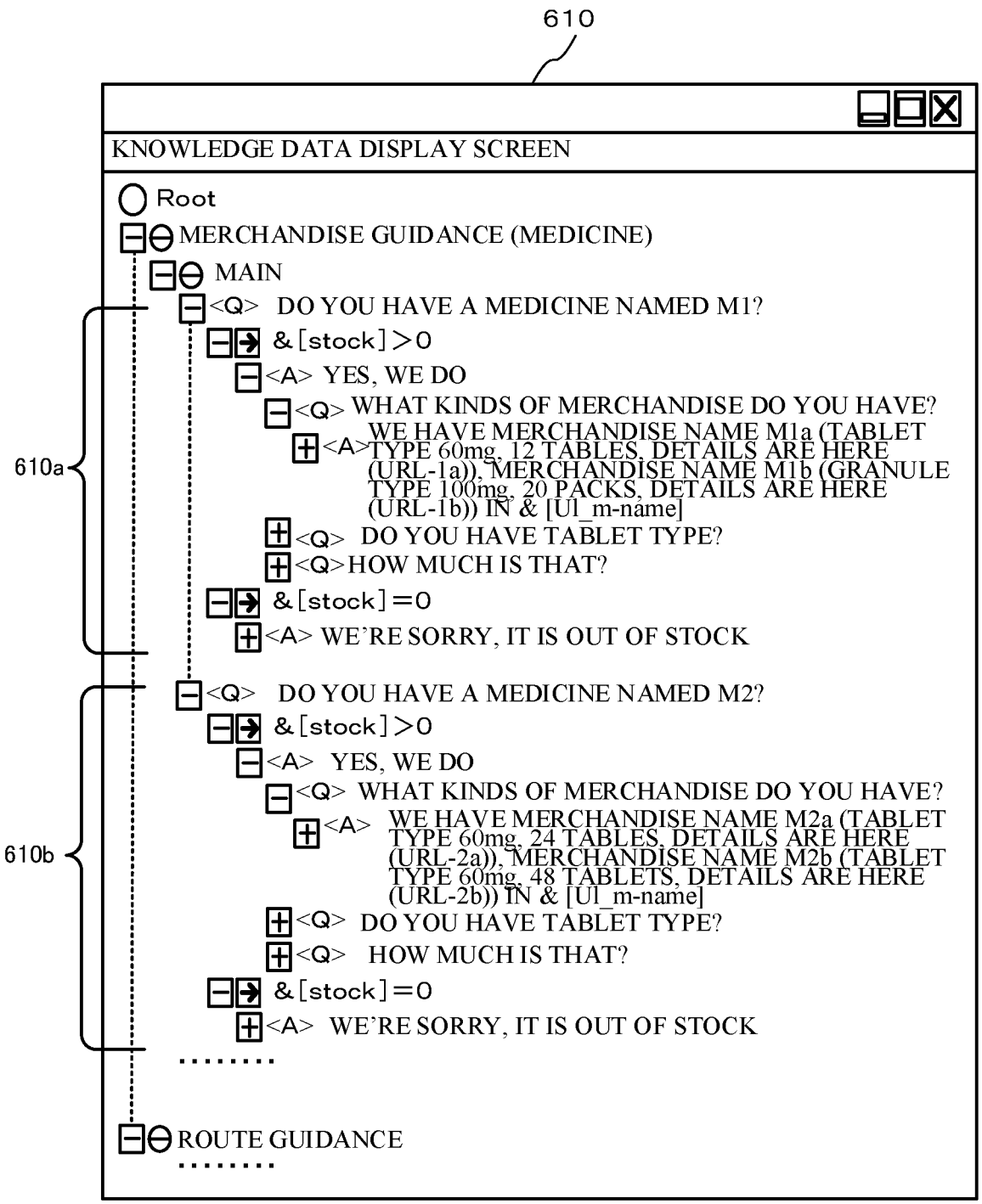
FIG. 6 is a chart illustrating a knowledge data display screen relating to the information providing system according to the embodiment of the present invention.

The knowledge data 250 shown as an example on a knowledge data display screen 610 of FIG. 6 contains knowledge data concerning merchandise guidance of medicines and knowledge data concerning route guidance of facilities such as bookstores and restaurants, which is data obtained as a result of compiling and developing the template data shown in FIG. 5.

The above-described compiling of the template data is executed by, for example, the client or the provider, administrator or the like of the information providing system 1 (by transmitting an instruction to the information management server 300 from the terminal). The knowledge data display screen 610 is a screen displayed by editing the knowledge data 250, which is displayed, for example, on a terminal of a compile executor connected to the information management server 300.

Here, in the knowledge data display screen 610 of FIG. 6, respective data of the knowledge data 250 is shown in the form of directories in a file system, and respective data is shown in a hierarchy indicating subordination relationship with respect to other data in the same manner as the template data display screen 600 of FIG. 5. Data displayed with the symbol of the minus sign surrounded by the square represents the state in which lower subordinate data concerning the data is displayed, and data displayed with the symbol of the plus sign surrounded by the square represents the state in which lower subordinate data concerning the data is not displayed.

"<Q>," "<A>" displayed on the right side of the symbols, the symbol with the arrow sign surrounded by the square are the same as in the template data display screen 600 of FIG. 5.

In the knowledge data display screen 610 of FIG. 6, for example, a plurality of sets of template data of the first assumed input sentence and corresponding response sentences explained in FIG. 5 are developed according to respective general names of the medicines, that is, some sets made by the assumed input sentences and corresponding response sentences are formed. These sets include lower subordinate assumed input sentences and response sentences.

That is, in the set denoted by a sign 610a, the highest assumed input sentence is "Do you have a medicine named M1?", which is a sentence in which a general name of a medicine "M1" is incorporated in the part of "$ ( . . . )" in the character string "Do you have a medicine named "$ (<![cdata [return getAllMedicineName ( )]]>)?" as the template of the first assumed input sentence in FIG. 5.

The response sentence with the condition "& [stock]>0" which is subordinate to the first assumed input sentence is developed as it is in the same manner as the template of FIG. 5, the subordinate response sentence "Yes, we do" is also developed as it is in the same manner as the template of FIG. 5, and further, further-subordinate three assumed input sentences "What kinds of merchandise do you have?", "Do you have a tablet type?", and "How much is that?" are developed as they are in the same manner as the template of FIG. 5.

However, as a response sentence subordinate to the assumed input sentence "What kinds of merchandise do you have?", "We have merchandise name M1a (tablet type 60 mg, 12 tables, details are here (URL-1a)), merchandise name M1b (granule type 100 mg, 20 packs, details are here (URL-1b))" in "&[UI_m-name]" is defined, and information concerning two product names "M1a", "M1b" as product names corresponding to the medicine having the general name "M1" is incorporated instead of the code "$ ( . . . )" in the template of FIG. 5. In addition to the above information, stock quantities of respective products may be incorporated.

The set of template data of the first assumed input sentence and corresponding response sentences explained in FIG. 5 is developed into a set denoted by a sign 610b. That is, the highest assumed input sentence in this set is "Do you have a medicine named M2?", which is a sentence in which a general name of a medicine "M2" is incorporated in the part of "$ ( . . . )" in the character string "Do you have a medicine named "$ (<![cdata [return getAllMedicineName ( )]]>)?" as the template of the first assumed input sentence in FIG. 5.

The response sentence with the condition "& [stock]>0" which is subordinated to the first assumed input sentence is developed as it is in the same manner as the template of FIG. 5, the subordinate response sentence "Yes, we do" is also developed as it is in the same manner as the template of FIG. 5, and further, further-subordinate three assumed input sentences "What kinds of merchandise do you have?", "Do you have a tablet type?", and "How much is that?" are developed as they are in the same manner as the template of FIG. 5.

However, as a response sentence subordinate to the assumed input sentence "What kinds of merchandise do you have?", "We have merchandise name M2a (tablet type 60 mg, 24 tables, details are here (URL-2a)), merchandise name M2b (tablet type 60 mg, 48 tablets, details are here (URL-2b))" in "&[UI_m-name]" is defined, and information concerning two product names "M2a", "M2b" as product names corresponding to the medicine having the general name "M2" is incorporated instead of the code "$ ( . . . )" in the template of FIG. 5.

The sets including the template of the first assumed input sentence explained in FIG. 5 are developed for respective merchandise contained in the intermediate data 350 extracted from the external data 400 provided by the client in the same manner after that. Furthermore, other sets including a template of another highest assumed input sentence are also developed based on the intermediate data 350 in the similar manner, thereby generating knowledge data 250 associated with respective merchandise.

The response sentences subordinate to the assumed input sentence "What kinds of merchandise do you have?" have the common pattern in this example; however, response sentences may be different according to general names of medicines or product names of medicines. For example, the client may form a response for inducing the user to refer to URLs by providing URL information with respect to medicines having specific general names, and may display specific individual explanatory notes with respect to medicines having other specific general names in the external data 400 for generating the intermediate data 350.

The knowledge data 250 has a later-described data structure, which can be edited by a text editor or the like, and it is also possible to edit the data such as addition, modification, and deletion on the knowledge data display screen 610 of FIG. 6.

When the knowledge data 250 is generated by the above compile processing, the knowledge data 250 becomes available in the information providing server 200 (namely, disclosed), for example, by an instruction of a compile executor or the like.

In the embodiment, the knowledge data 250 is developed based on the template data 240 (for example, a set of the assumed input sentence and the response sentences is generated for each of merchandise actually dealt with by the client) as described above; therefore, it is not necessary to create patterns or scenarios of the assumed input sentences and the response sentences for respective merchandise. When it is necessary to define the knowledge data 250 respectively for an enormous number of merchandise, the labor for that can be largely reduced. It is just necessary for a person in charge to create one template for the common pattern including the assumed input sentences and responses corresponding to the assumed input sentences.

Figure 7:
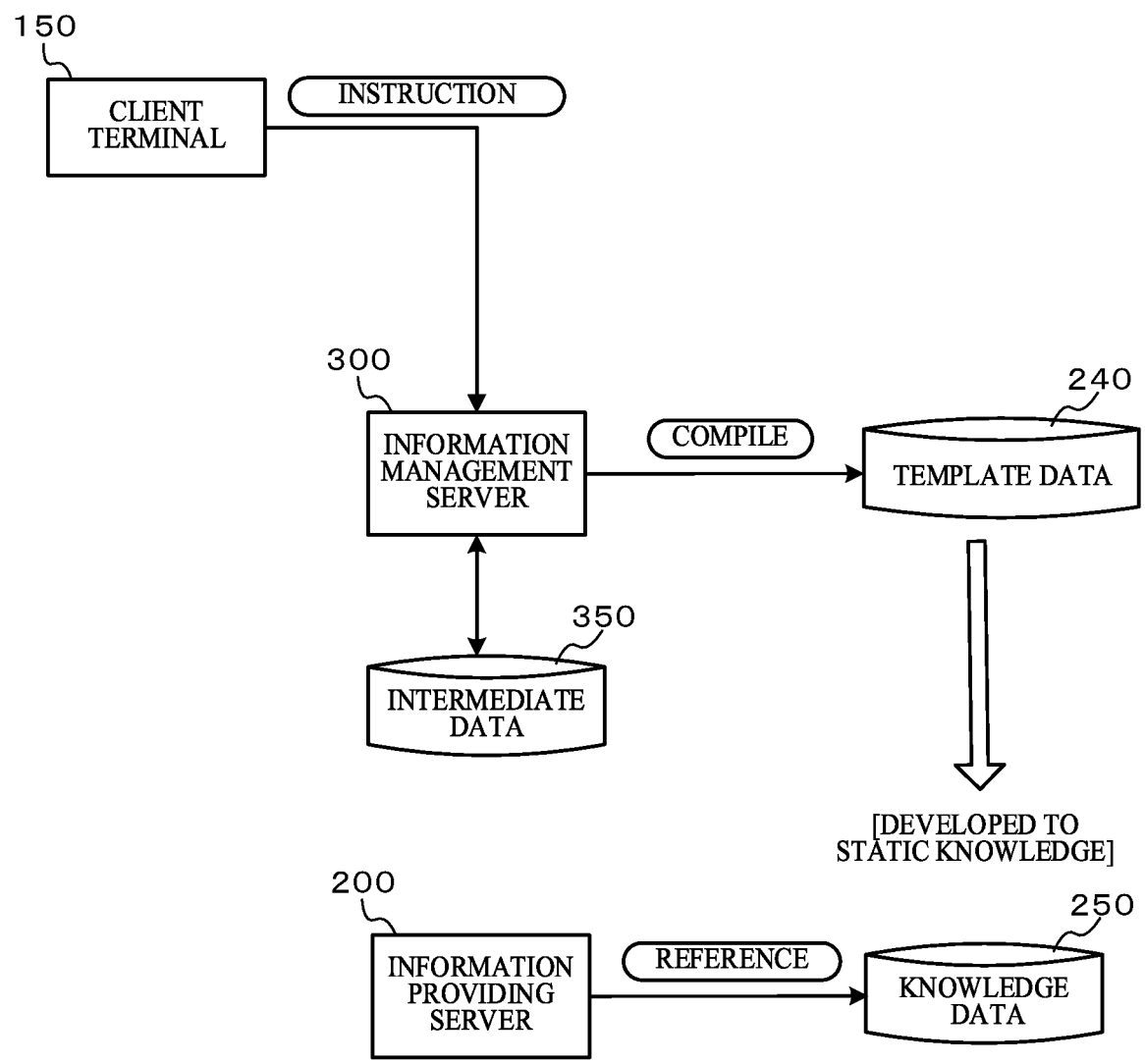
FIG. 7 is a diagram for explaining the flow of generating knowledge data in the information providing system according to the embodiment of the present invention.

FIG. 7 is a diagram showing the flow of processing for generating the knowledge data 250 according to the embodiment. The client terminal 150 operated by the client is connected to the information management server 300 of the information providing system 1 and gives an instruction for compiling, thereby developing (for example, the sets of the assumed input sentences and response sentences in the template data 240 for each of merchandise individually) by referring to the intermediate data 350 to generate knowledge data 250.

More specifically, in a case where a prescribed code such as a script or a function is found in the assumed input sentence when referring to the template data 240, the code is interpreted and executed, then, prescribed items (for example, the general name of merchandise and so on) stored in the intermediate data 350 are referred in accordance with the script or the function, after that, a set of the assumed input sentences and the response sentences is generated for each item to be accumulated in the knowledge data 250 in the compile processing.

For example, "getAllMedicineName ( )" described in the template data 240 shown in FIG. 5 is a function name for acquiring all general names of medicines stored in the intermediate data 350. When the function is executed in a prescribed execution environment, knowledge data is developed for all medicines (general names). Moreover, "getStockMedicineInfo ( )" described in the template data 240 shown in FIG. 5 is a function name for acquiring all product names of products in stock in product names corresponding to the general names of medicines stored in the intermediate data 350. When the function is executed in a prescribed execution environment, products in stock in the products relating to the medicines are developed as knowledge data subordinated to knowledge data concerning the medicines (general names). Note that the function may be for acquiring the stock quantities of respective products.

In the embodiment, the template data 240 is configured to contain the code including the function name to be executed as described above, and any type of code may be described as long as what kind of development processing is performed when being read can be captured. Furthermore, other various schemes may be constructed, for example, data in which how to perform the development processing referring to the intermediate data 350 or the like, and to which assumed input sentence (Q) or which response sentence (A) the development processing is performed are separately defined is stored, or other schemes.

Here, creation (generation) of the intermediate data 350 is also performed by the information management server 300 by an instruction through the client terminal 150 (see FIG. 3). The template data 240 can be designed and created by the client.

Therefore, design/creation of the template data 240 can be performed by the client or the like in accordance with change in the set of the assumed input sentences and the response sentences or change in the scenario appropriately (namely, "dynamically"), and similarly, the creation of the intermediate data 350 can be also performed in accordance with variation in merchandise appropriately (namely, "dynamically") in the information providing system 1 according to the present invention. Then, when the knowledge data 250 is generated by the above compile processing, the knowledge data 250 is referred to by the information providing sever 200 as "static" knowledge which is not changed at least during control of the conversation with respect to the user 10.

The client may generate the knowledge data 250 from the template data 240 by performing compile processing concerning all objects of topics (for example, all merchandise) in the compile processing whatever topic will be an object of the conversation in the user 10; however, the knowledge data 250 may be developed when the user 10 selects a category of the topic or classification of a question on the user terminal 100, or may be developed only concerning targets corresponding to the category, classification, the contents in accordance with transition in the contents of input sentences and responses dynamically at a predetermined timing.

According to the above, the volume of the knowledge data 250 can be reduced and efficiency of searching can be improved. It is also possible to configure the system so as to delete knowledge data of topics when the relation to a current topic is lost (or when the possibility that relation has become shallow is high) in a case where the topic inputted by the user 10 is changed or in a case where the topic is changed by control of the scenario by the information providing system 1.

FIG. 8A is a chart showing the contents of the template data 240 as an example. The template data 240 can use various types of data formats such as CSV data, text data, the database accessible by the prescribed DBMS (database management system), and specific files accessible by the prescribed application in the same manner as the above knowledge data 250; however, respective data is represented in a tabular form in this case for convenience.

Records contained in the template data 240 shown in FIG. 8A include respective items of category, type, QA discrimination, NO (sequence number), Q/A, subordinate NO, and condition.

The category indicates the highest classification of a topic presented by a conversation function provided by the information providing system 1, which includes "merchandise guidance (medicine)", "route guidance", and so on. The type indicates classification in the category, and "M" means "main". The QA discrimination is a discrimination indicating whether the record corresponds to the assumed input sentence (Q) or corresponds to the response sentence (A). The NO (sequence number) indicates sequence numbers of the records, which is used in the item of later-described subordinate NO.

The Q/A indicates phrases or codes to be a basis of the assumed input sentence (Q) or the response sentence (A) to be provided to the user terminal 100. The subordinate NO indicates to which record the record is subordinated, whereby the hierarchy of the assumed input sentences (Q) and the response sentences (A) is defined. The condition indicates in which condition the assumed input sentence (Q) or the response sentence (A) of the record is used. Other assumed input sentences (Q) and response sentences (A) which are subordinate to the record also follow the condition.

For example, codes (scripts, and functions) such as "$ (<![cdata [return getAllMedicineName ( )]]>)" included in Q/A of a record of NO=001 and "$ (<![cdata [return getStockMedicineInfo ( )]]>)" included in Q/A of a recode of NO=004 can be checked on the template data display screen 600 shown in FIG. 5 in the same expressions.

Similarly, codes such as "& [stock]=0" set in the condition of records of NO=002, 201 and "& [UI_m-name]" included in Q/A of the record of NO=004 can be also checked on the template data display screen 600 shown in FIG. 5 in the same expressions.

FIG. 8B is a chart showing the contents of the knowledge data 250 as an example. The knowledge data 250 use various types of data formats such as CSV data, text data, the database accessible by the prescribed DBMS (database management system), specific files accessible by the prescribed application as described above; however, respective data is represented in a tabular form in this case for convenience.

Records contained in the knowledge data 250 shown in FIG. 8B include respective items of category, type, QA discrimination, NO (data sequence number), Q/A, subordinate NO, condition, and supplementary information.

The category, the type, the QA discrimination, the NO (data sequence number), the Q/A, subordinate NO, and the condition are the same items as those of the template data 240 explained with reference to FIG. 8A. However, in the item of Q/A of NO=1001, 2001, processing in accordance with the code has been executed by the above compile processing, and general names of the medicines (M1, M2) are respectively embedded, as a result, the expression of the code "$ ( . . . )" included in Q/A of the template data 240 does not exist.

Similarly, also in the item of Q/A of NO=1004, 2004, the product names of the medicines are respectively embedded by the above compile processing, as a result, the expression of the code "$ ( . . . )" included in Q/A of the template data 240 does not exist.

Moreover, in the item of supplementary information, URL 1, URL 2 are added respectively in the records of NO=1004, 2004. In the records of NO=1004, 2004, the code "& [UI_m-name]" is taken over as it is from the template data 240, and this code is evaluated according to need when receiving the input sentence from the user 10 by the information providing server 200.

That is, a data group D1 (NO=1 to 202) of the template data 240 in FIG. 8A is developed into a data group D2 (NO=1001 to 1202), D3 (NO=2001 to 2202), . . . , and so on by the compile processing.

Figure 9:
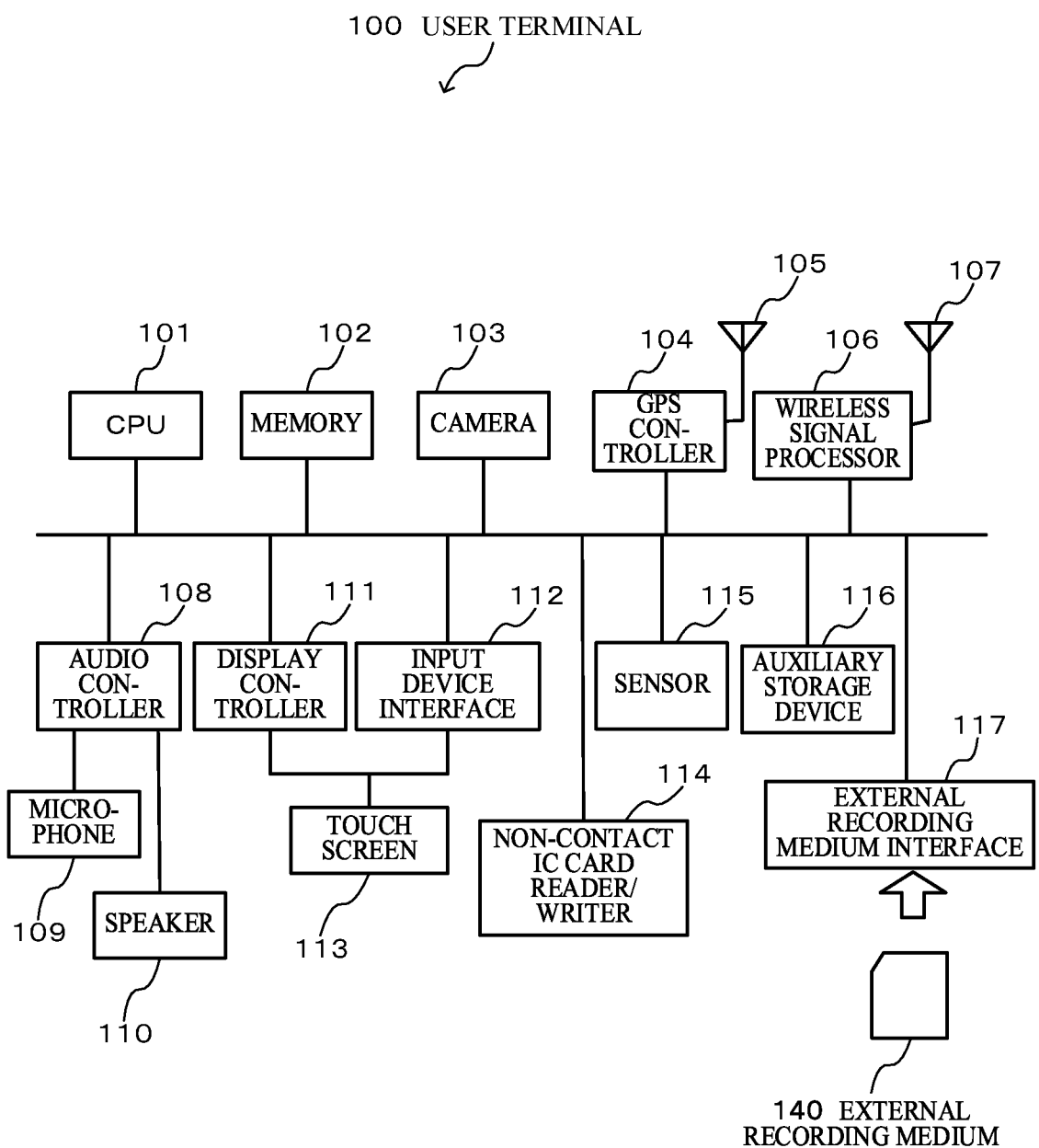
FIG. 9 is a diagram showing an example of a hardware configuration of a computer forming the user terminal relating to the information providing system according to the present invention.

Next, an example of a hardware configuration of a computer forming the user terminal 100 according to the embodiment of the present invention will be explained with reference to FIG. 9. The user terminal 100 is, for example, a portable device such as a smart phone. A configuration of the user terminal 100 shown in FIG. 9 is a typical configuration as an example. The configuration of the computer may be adopted as a configuration of the client terminal 150 or the like.

The user terminal 100 includes a CPU (Central Processing Unit) 101, a memory 102, a camera 103, a GPS controller 104, a GPS antenna 105, a wireless signal processor 106, a wireless communication antenna 107, an audio controller 108, a microphone 109, a speaker 110, a display controller 111, an input device interface 112, a touch screen 113, a non-contact IC card reader/writer 114, a sensor 115, an auxiliary storage device 116, and an external recording medium interface 117.

The CPU 101 controls operations of respective components of the user terminal 100 to execute respective functions under control of OS.

The memory 102 is normally configured by a RAM (Random Access memory). Programs for realizing respective functions executed in the CPU 101 are loaded to the memory 102 at the time of execution, and data and so on necessary for the programs is temporarily stored.

The camera 103 is a small-sized imaging device incorporated in the user terminal 100. The GPS controller 104 receives signals from plural GPSs through the GPS antenna 105 to check a position of the user terminal 100.

The wireless signal processor 106 performs communication with a cell-phone base station through the wireless communication antenna 107, controlling transmission/reception of call data with respect to other devices and transmission/reception of WEB pages and mail data with respect to other terminals (through Internet). The wireless signal processor 106 also realizes communication with respect to a wireless LAN access point by wireless LAN using the wireless communication antenna 107 to perform data transmission/reception through Internet (in this case, the wireless communication processor 106 and the wireless communication antenna 107 perform wireless communication between the terminal and the cell-phone base station and wireless communication between the terminal and the wireless LAN access point for convenience.)

The audio controller 108 realizes a call by wireless communication by controlling the microphone 109 and the speaker 110, and on the other hand, controls output of audio when reproducing movies or music on applications.

The touch screen 113 displays information on a display device configured by, for example, an LCD (Liquid Crystal Display) or the like and detects a position touched (pressed) by the user with a finger on a screen surface by a resistivefilm type touch sensor or a capacitive type touch sensor. The display controller 111 processes drawing data issued by the CPU 101 and outputs, for example, a WEB page, video and the like on the display device of the touch screen 113. When the touch sensor of the touch screen 113 detects an operation by the user, the input device interface 112 transmits the operation as a prescribed signal to the CPU 101.

When a card in which a non-contact IC chip is embedded is held over a prescribed position of the user terminal 100, the non-contact IC card reader/writer 114 reads data stored in the IC chip or writes a prescribed data on the IC chip based on an instruction of the CPU 101.

The sensor 115 is a sensor other than the touch sensor of the touch screen 113, which is a motion sensor, an optical sensor, or a proximity sensor.

The auxiliary storage device 116 is configured by a semiconductor memory called a flash memory or a hard disc. The auxiliary storage device 116 stores programs for realizing respective functions executed in the CPU 101 and stores various data.

The external recording medium interface 117 accesses an external recording medium 140 and reads the data recorded therein. The external recording medium 140 is, for example, a portable flash memory.

Figure 10:
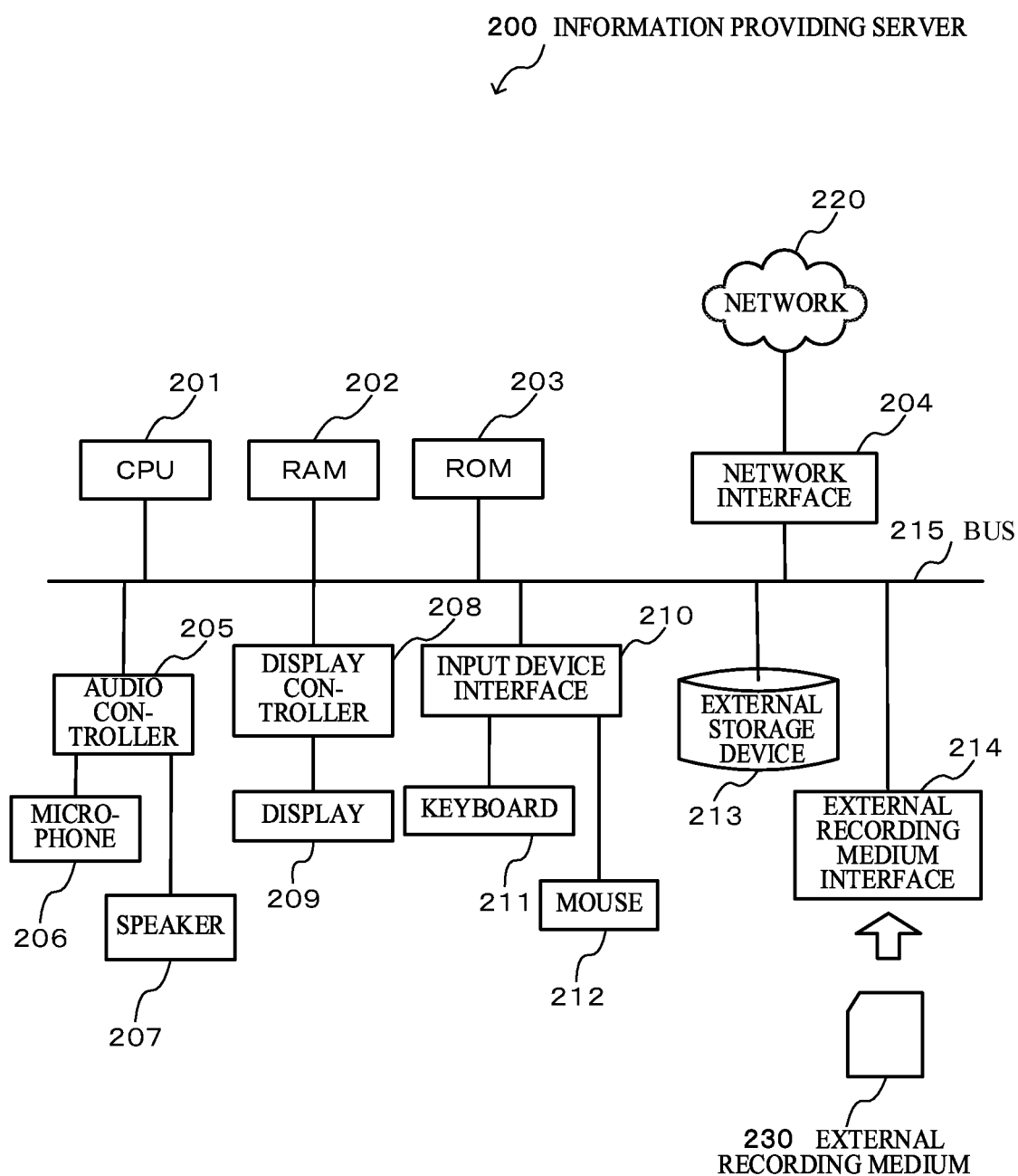
FIG. 10 is a diagram showing an example of a hardware configuration of a computer forming an information providing server included in the information providing system according to the present invention.

Next, an example of a hardware configuration of a computer forming the information providing server 200 of the information providing system 1 according to the embodiment of the present invention will be explained with reference to FIG. 10. A configuration of the information providing server 200 shown in FIG. 10 is a typical configuration as an example. The configuration of the computer may be adopted as configurations of the information management server 300, the user terminal 100, the client terminal 150 and the like.

The information providing server 200 includes a CPU 201, a RAM 202, a ROM (Read Only Memory) 203, a network interface 204, an audio controller 205, a microphone 206, a speaker 207, a display controller 208, a display 209, an input device interface 210, a keyboard 211, a mouse 212, an external storage device 213, an external recording medium interface 214, and a bus 215 connecting these components to one another.

The CPU 201 controls operations of respective components of the information providing server 200 and controls execution of respective functions according to the present invention under control of OS.

In the RAM 202, programs for executing respective processing executed in the CPU 201 or data used during execution of these programs are temporarily stored. In the ROM 203, a program executed at the time of activating the information providing server 200 and the like are stored.

The network interface 204 is an interface for connecting to a network 220. The network 220 is a network, for example, between the information providing server 200 and the user terminal 100, which corresponds to the network 500 shown in FIG. 1.

The audio controller 205 controls input/output of audio by controlling the microphone 206 and the speaker 207. The display controller 208 is a dedicated controller for actually processing a drawing instruction issued by the CPU 201. The display 209 is, for example, a display device configured by the LCD.

The input device interface 210 receives signals inputted from the keyboard 211 or the mouse 212 and transmits a prescribed instruction to the CPU 201 in accordance with a signal pattern.

The external storage device 213 is a storage device such as a hard disc or a semiconductor memory, and the above programs and data are recorded in the device. For example, the knowledge data 250, the intermediate data 350 and the like may be stored in the external storage device 213.

The external recording medium interface 214 accesses the external recording medium 230 to read data recorded therein. The external recording medium 230 is, for example, a portable flash memory or the like. The programs executed in the CPU 201 and for realizing respective functions of the present invention may be provided from the external recording medium 230 through the external recording medium interface 214. As another distribution route for the programs for realizing respective functions of the present invention, a route in which the programs are stored from a prescribed server on the network to the external storage device 213 or the RAM 202 through the network 220 and the network interface 204, and other routes can be considered.

The information providing system 1 according to one embodiment of the present invention has been explained while showing specific examples capable of achieving the present invention; however, these specific examples are just examples for explaining the present invention, and the scope of right in the present invention is not limited to these specific examples. The technical idea of the present invention can be realized by various methods and configuration other than the above specific examples.

REFERENCE SIGNS LIST

1: information providing system
100: user terminal
200: information providing server
240: template data
250: knowledge data
300: information management data
350: intermediate data
400: external data
500: network

The invention claimed is:

1. A computer-based information providing system operating on a network that generates and transmits response contents based on input conversation information, the information providing system comprising:
a user terminal comprising at least one or more of an input button, a selectable icon, a keyboard, a graphical user interface, a microphone, and a speaker, the user terminal in communication with an input receiving unit that receives input conversation information from the user terminal;
an information providing server in communication with a non-transitory computer readable storage medium that stores knowledge data, the knowledge data comprising:
a plurality of sets of assumed input sentences assumed as the input conversation information, and
a plurality of sets of response sentences corresponding to the assumed input sentences,
wherein, at least part of the plurality of sets of the assumed input sentences and the plurality of response sentences are generated via a predefined template of assumed input sentences and a predefined template of response sentences, each of the predefined template of assumed input sentences and predefined template of response sentences corresponding to one or more predefined data groups;
an information management server in communication with a non-transitory computer readable medium storing predefined template data corresponding to the predefined template of assumed input sentences and the predefined template of response sentences, as well as storing intermediate data, the information management server generating the knowledge data based on the predefined template data and the intermediate data, wherein, the predefined template data comprises template information that is generated and inputted by one or more of an administrator or a client of the information providing system, and the intermediate data comprises information that is generated and inputted by a client of the information providing system; and, wherein, upon receiving the input conversation information, the information providing server:

analyzes the input conversation information received from the user terminal and performs at least one of morphological analysis or semantic analysis in which terms and phrases contained in the input conversation information are recognized;

performs complementary processing of the input conversation information, the complementary processing comprising at least one of: wording processing that adjusts wording, modification relation analysis processing, determination processing of parent-child relation of words, determination processing of word importance, and determination processing of affirmative and negative;

compares the analyzed and processed input conversation information with the plurality of sets of assumed input sentences stored in the knowledge data; and based on the comparison, generates the response contents based on a correlation of the input conversation information and the knowledge data, the response contents including at least one or more of:

one or more response sentences correlating with the input conversation information, information indicating that one or more response sentences was not found, or a request to clarify the input conversation information; and, wherein, when a prescribed inquiry code is associated with the one or more response sentences, the information providing server obtains one or more of the intermediate data or the client knowledge data from the information management server and generates and transmits the response contents based on the one or more response sentences, and the intermediate data or the client knowledge data.

2. The information providing system according to claim 1, wherein, when the prescribed inquiry code is included in a response sentence corresponding to an assumed input sentence, the information providing server acquires the intermediate data or the client knowledge data corresponding to the prescribed inquiry code and generates and transmits the response contents based on the acquired data.

3. The information providing system according to claim 2, wherein the predefined one or more data groups are generated from existing management data.

4. The information providing system according to claim 1, wherein the one or more predefined data groups are generated from existing management data.

5. The information providing system according to claim 1, wherein the intermediate data comprises modified difference data that includes historical adjustment information, the modified difference data stored separately from the intermediate data generated and input by a client.

6. The information providing system according to claim 1, wherein, when a prescribed inquiry code is not associated with the one or more response sentences, the information management server generates and transmits the one or more response sentences.

7. A non-transitory computer readable medium in communication with an information providing system operating on a network that generates and transmits response contents based on input conversation information, the information providing system comprising:

a user terminal comprising at least one or more of an input button, a selectable icon, a keyboard, a graphical user interface, a microphone, and a speaker, the user terminal in communication with an input receiving unit that receives input conversation information from the user terminal;

an information providing server in communication with the non-transitory computer readable storage medium; and, an information management server in communication with the non-transitory computer readable medium, wherein the non-transitory computer readable medium includes knowledge data, predefined template data, and intermediate data accessed by the information providing system to generate response contents based on input conversation information input at the user terminal, wherein the knowledge data comprises:

a plurality of sets of assumed input sentences assumed as the input conversation information, and a plurality of sets of response sentences corresponding to the assumed input sentences, wherein, at least part of the plurality of sets of the assumed input sentences and the plurality of response sentences are generated via a predefined template of assumed input sentences and a predefined template of response sentences, each of the predefined template of assumed input sentences and predefined template of response sentences corresponding to one or more predefined data groups;

wherein, the predefined template data is transmitted to the information providing server and corresponds to the predefined template of assumed input sentences and the predefined template of response sentences, and is generated and input by one or more of an administrator or a client of the non-transitory computer readable medium;

wherein the intermediate data comprises information that is generated and input by a client of the information providing system; and, wherein, one or more of the template assumed input sentences includes a prescribed inquiry code, the prescribed inquiry code controlling the one or more of the template assumed input sentences and the one or more of the template response sentences to be subsequently developed with respect to the one or more predefined data groups so as to generate the response contents based on the one or more of the template response sentences, and the intermediate data or the client knowledge data.

* * * * *